Sept. 24, 1946.  G. GOEBEL ET AL  2,408,019
ARTICLE HANDLING APPARATUS
Original Filed Oct. 17, 1938  8 Sheets-Sheet 1
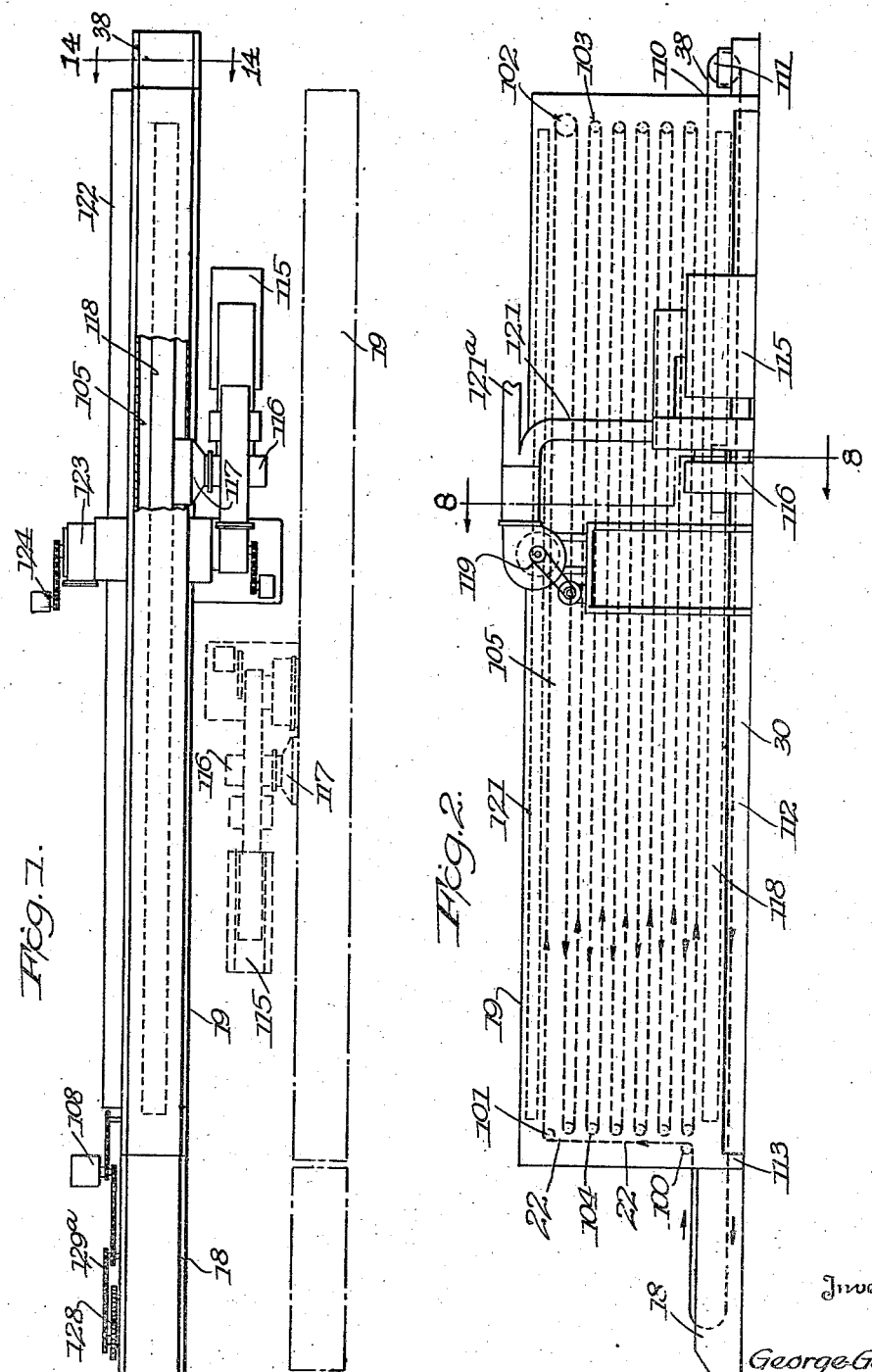

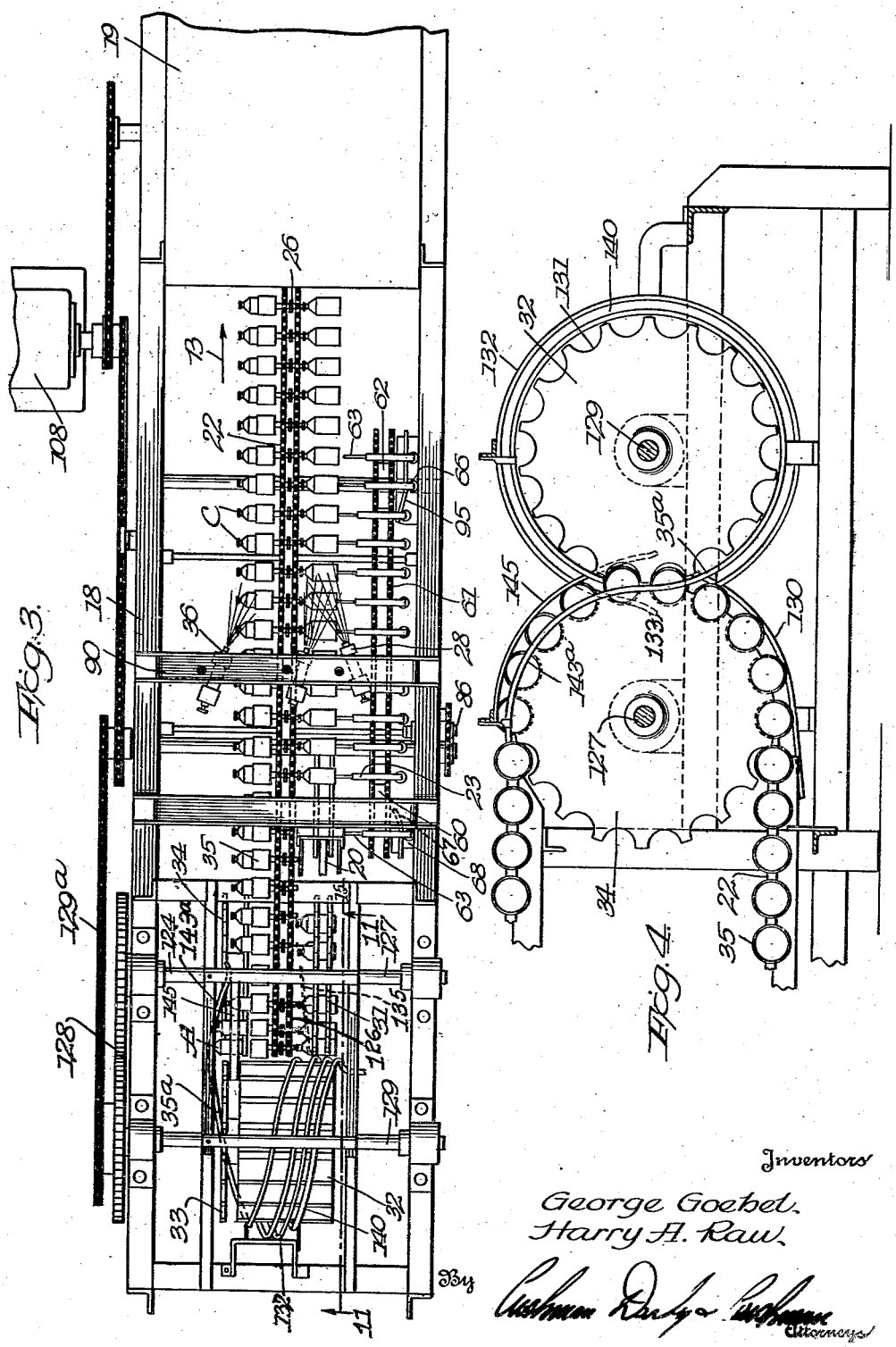

Sept. 24, 1946.    G. GOEBEL ET AL    2,408,019
ARTICLE HANDLING APPARATUS
Original Filed Oct. 17, 1938    8 Sheets-Sheet 3
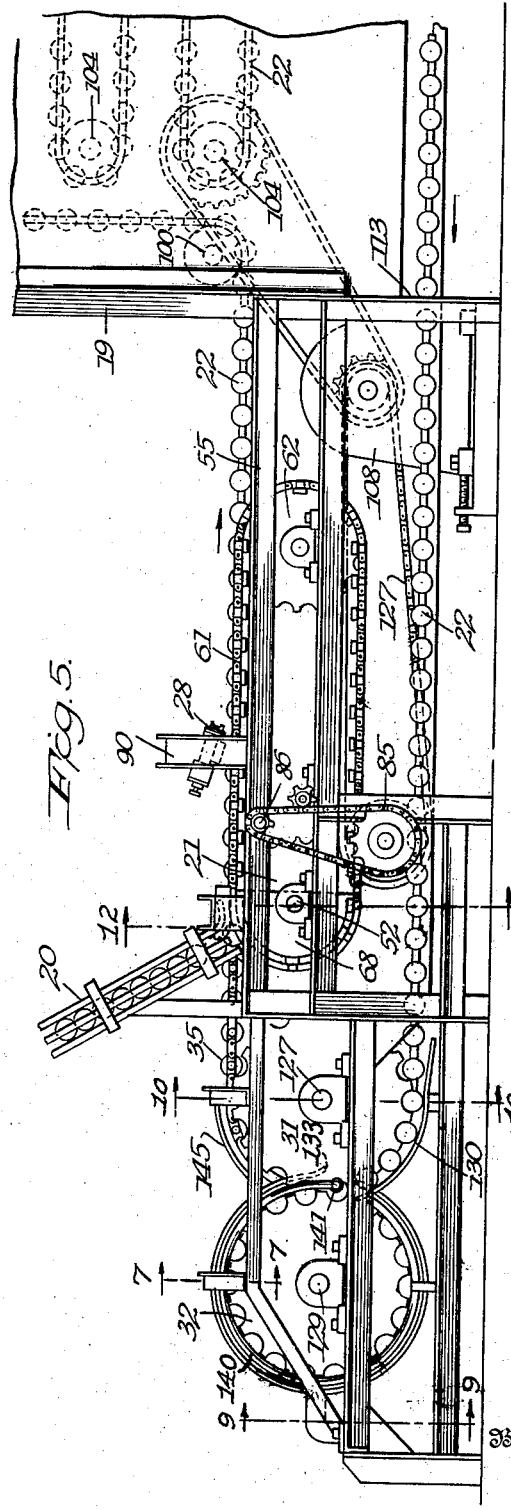
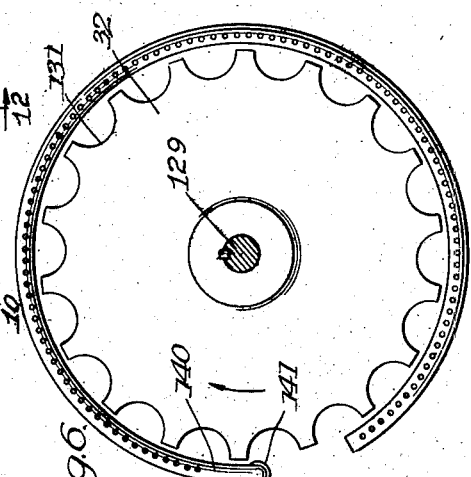
Inventors
George Goebel
Harry A. Rau
By
Attorneys Sept. 24, 1946.  G. GOEBEL ET AL  2,408,019
ARTICLE HANDLING APPARATUS
Original Filed Oct. 17, 1938   8 Sheets-Sheet 4

Inventors
George Goebel
Harry A. Raw
By
Attorneys

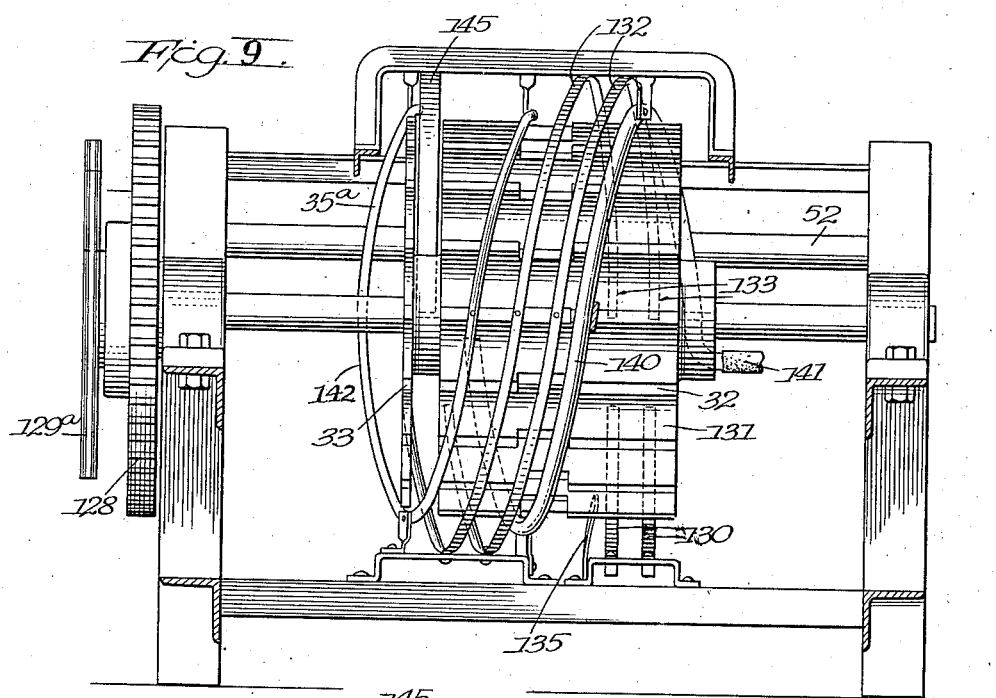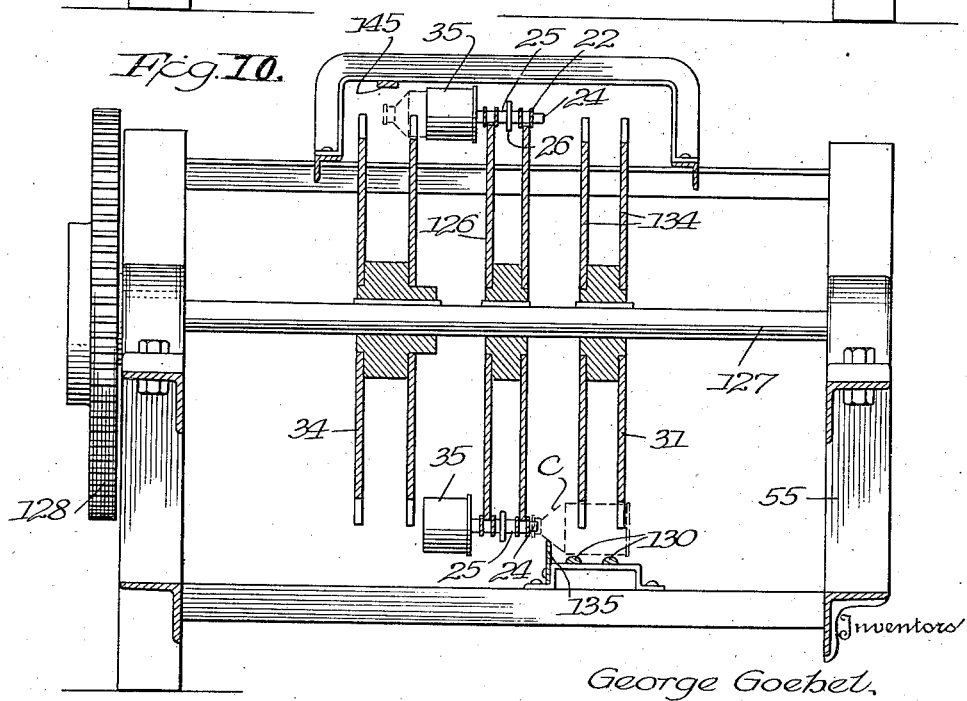

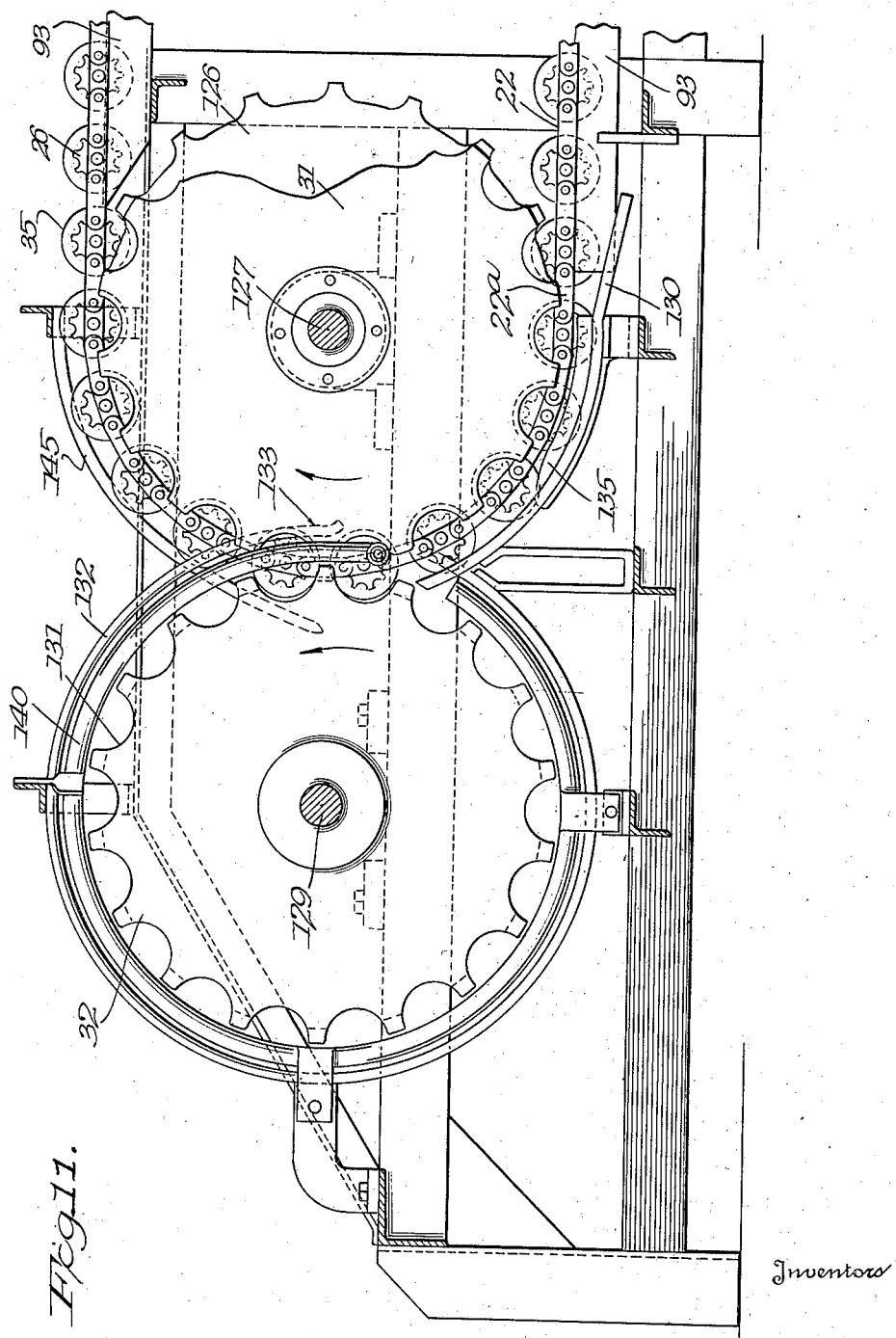

Sept. 24, 1946.   G. GOEBEL ET AL   2,408,019
ARTICLE HANDLING APPARATUS
Original Filed Oct. 17, 1938   8 Sheets-Sheet 8
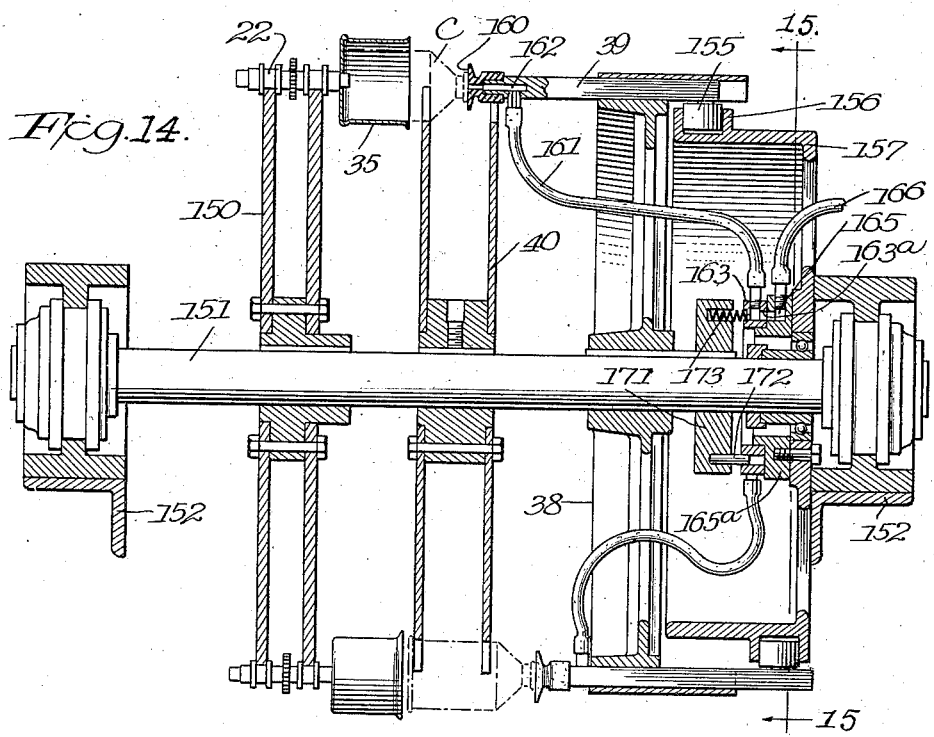
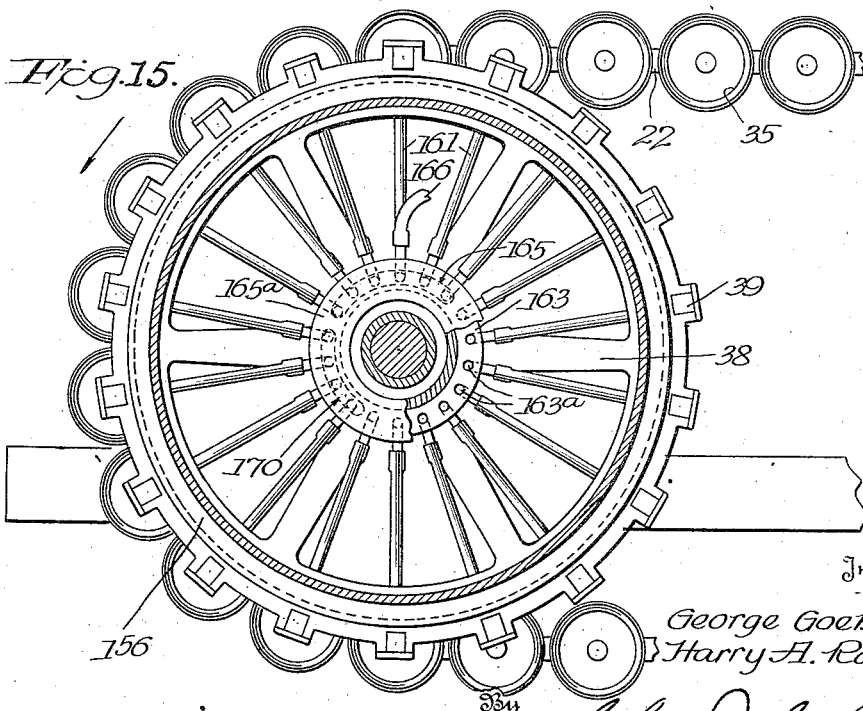

Patented Sept. 24, 1946

2,408,019

UNITED STATES PATENT OFFICE 2,408,019

ARTICLE HANDLING APPARATUS

George Goebel, deceased, late of Baltimore, Md., by Helene Goebel, administratrix, Baltimore, Md., and Harry A. Rau, Baltimore, Md., assignors to Crown Cork & Seal Company, Inc., Baltimore, Md., a corporation of New York Original application October 17, 1938, Serial No. 235,496. Divided and this application November 12, 1942, Serial No. 465,380

7 Claims. (Cl. 198—24)

The present invention relates to an article handling apparatus. The application is a division of the application of George Goebel and Harry A. Rau for Coating apparatus, filed October 17, 1938, Serial No. 235,496 and issued November 9, 1943, as Patent No. 2,334,087.

An object of the invention is the provision of a means to transfer articles from one supporting means to another supporting means without interrupting the travel of the article and without marring it in any way.

Another object of the invention is to provide an apparatus of such construction that a can or other article may be so handled and supported that it can be thoroughly coated over its entire exterior surface, including its mouth or other aperture, during passage through a single apparatus.

The invention is described and illustrated herein as applied to the handling of cone-top cans such as are used for packaging beer or other beverages and, more particularly, for the handling of such cans during the coating of the same. However, it will be clear that the invention may be used for the handling of numerous types of articles while they are being treated for various purposes, or simply to transfer them from one conveyor element to another.

Another object of the invention is to provide a drier including a heating area and a cooling area through which a conveyor may successively move coated articles and which is of such construction that it will occupy a minimum area.

Other objects and advantages of the invention will be apparent from the following specification and drawings wherein:

Figure 1 is a plan view of the present apparatus;

Figure 2 is a side elevation of the apparatus;

Figure 3 is a plan view of the infeed or spraying portion of the apparatus;

Figure 4 is a vertical longitudinal sectional view of the article transfer mechanism;

Figure 5 is a side elevation of the infeed or spraying portion of the apparatus;

Figure 6 is a detail vertical sectional view showing the transfer drum in side elevation;

Figure 7 is a transverse vertical sectional view on the line 7—7 of Figure 5;

Figure 9 is a transverse vertical sectional view on the line 9—9 of Figure 5;

Figure 10 is a transverse vertical sectional view on the line 10—10 of Figure 5;

Figure 11 is a longitudinal vertical sectional view on the line 11—11 of Figure 3;

Figure 14 is a transverse vertical sectional view on the line 14—14 of Figure 1, and Figure 15 is a sectional view on the line 15—15 of Figure 14.

Figure 8:
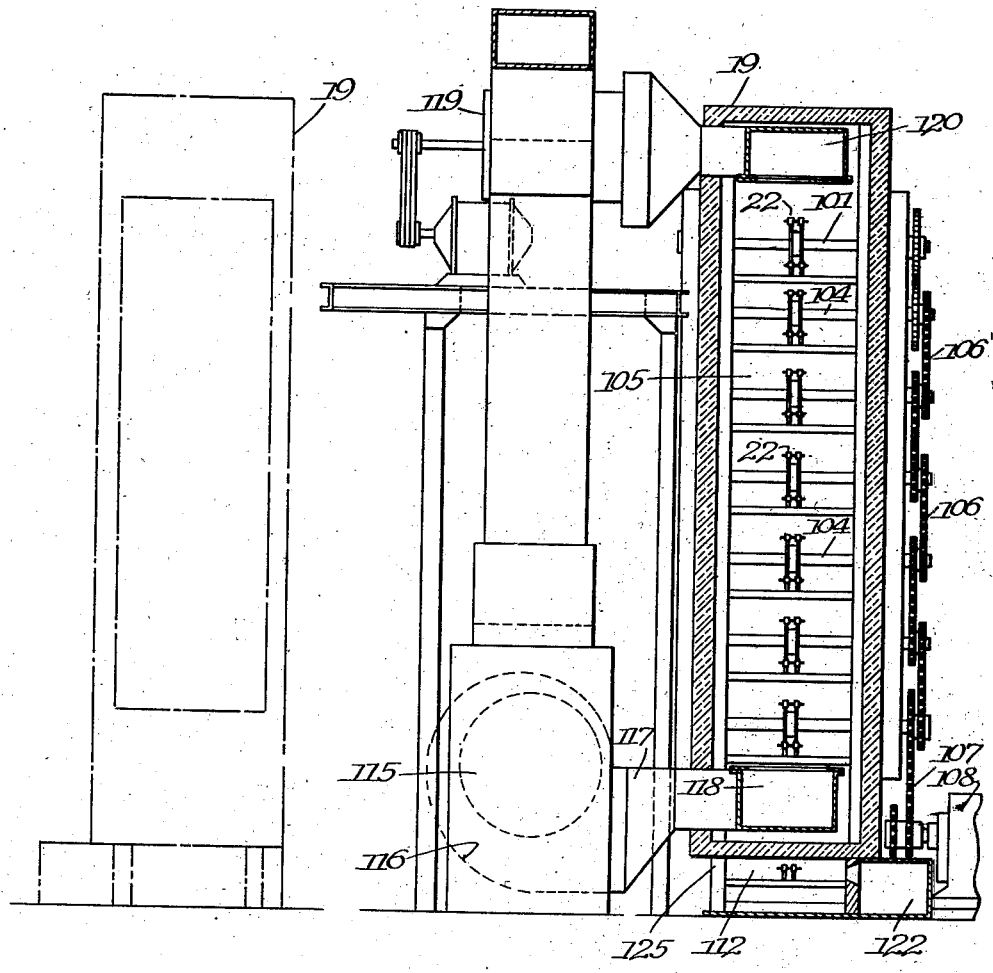
Figure 8 is a vertical sectional view on the line 8—8 of Figure 2.

The structure and operation of the present apparatus may be generally described as follows: The embodiment of the apparatus disclosed herein is primarily intended for handling cone-topped cans C during the application of lacquer thereto. Such cans have a cone-shaped top wall and a mouth or pouring spout formed to receive a cap of the crown type. The machine may be generally described as comprising two portions, namely, an infeed and spraying portion 18 (Figures 1 and 3), and an oven or drier portion 19 (Figures 1, 2, and 8).

Figure 12:
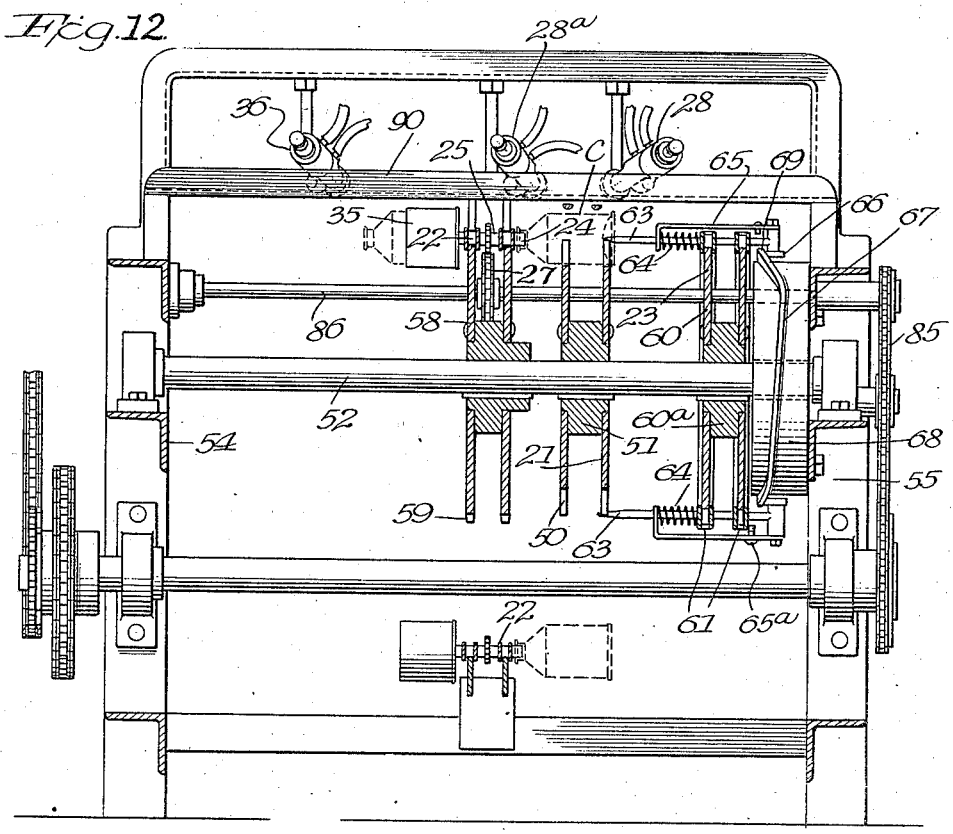
Figure 12 is a transverse vertical sectional view on the line 12—12 of Figure 5.

Cans to be coated are delivered to the infeed and spraying portion 18 of the machine through an infeed chute 20 (Figures 3 and 5), each can falling into a pocket of an infeed spider 21. As shown in Figures 3 and 12, the upper run of the main conveyor 22 of the apparatus moves alongside the infeed spider 21 and each can C moving down upon the spider will be forced laterally of the latter by an aligned reciprocable rod of a can seating mechanism 23 so that the mouth of the can will be brought into engagement with an aligned supporting element, head, or stud 24 on the adjacent side of the conveyor 22, the mouth of the can then fitting snugly about the supporting element.

As described in said original application, each supporting device or stud 24 may be fixed to a spindle 25 which is rotatable in the conveyor chain 22, and immediately after the can has been positioned on the supporting stud or head 24 a pinion or sprocket 26 midway of the spindle 25 may come into engagement with the upper run of an endless chain 27 (Figure 5) moving below the conveyor 22 and in the opposite direction to the direction of movement of the latter. As a result, the spindle 25 and the can C carried thereby may be rotated on their longitudinal axes. During such rotation the can may move beneath a pair of spray guns 28 and 28a (Figures 3 and 12), one of which is positioned to direct lacquer upon the bottom wall of the can, the other gun being mounted to direct lacquer upon the side wall, cone top and the exterior portion of the mouth of the can. Since the can is rotating on its own axis during the spraying, its exterior will be entirely coated with the lacquer.

If the above spraying is performed, the aligned rod of the can seating mechanism 23 may be in contact with the center of the bottom of the can while it occurs, but the rod will move out of contact with the can when the spraying is concluded, the can remaining upon the supporting element or head 24 to be carried through the drier portion 19. The conveyor 22 moves alternately back and forth in the drier 19 as indicated in Figure 2 so that the can will be subjected to drying treatment for approximately fifteen minutes. As indicated in Figures 2 and 8, throughout the initial and greater part of its travel in the drier 19 the conveyor 22 moves through the upper part of the drier, where it will be subjected to the action of heated air, but the lowermost run of the chain in the drier 19 moves through a cooling chamber 30 so that each can will be fairly cool when it leaves the drier. As indicated in Figure 11, the lower run of conveyor 22 which moves from the lower portion of the drier 19 will move about a pocketed spider 31 and while the chain is moving about this spider, the cans C will be removed from the supporting heads 24 of the conveyor 22 and will be positioned upon a transfer drum 32 (Figures 3 and 11).

As generally illustrated in Figure 3 and as shown in detail in Figures 9 and 11, drum 32 is provided with a plurality of axially extending grooves in its periphery, in which the cans are received. While rotating with the drum, the cans will be moved to the far ends of the grooves so that their conical ends will be positioned in aligned pockets of a disc 33 which rotates with transfer drum 32. After such movement with the drum 32 and disc 33, the cans will be received in pockets of a spider 34 formed of a pair of aligned and pocketed discs, spider 34 being fixed to the same shaft as spider 31, as indicated in Figure 3 and as shown in Figure 10. Cans carried by the spider 34 will be in axial alignment with cup-shaped supporting elements or carriers 35 carried on the spindles 25 at the opposite end thereof from the heads 24. The carriers 35 are of sufficiently large internal diameter to receive the base portions of the cans, and the cans will be moved into the carriers 35 by a fixed inwardly inclined guide element or strip 35a shown in plan in Figure 3.

As indicated in Figures 3 and 12, shortly after a can is positioned in one of the carriers 35, the section of the chain 22 upon which that carrier is positioned will move over the previously mentioned oppositely moving endless chain 27 so that the spindle 25 with which the carrier 35 is associated will be rotated, causing the can to rotate. If the cans are being coated, they will move beneath a spray gun 36 which will direct lacquer upon the rotating lip and inner surface of the mouth of the can while the cans are being thus rotated. In any event, rotation of the can will cease after its spindle 25 has moved out of engagement with the endless chain 27, and the can will again move through the drier 19. As stated above, the conveyor 22 moves alternately back and forth within the drier 19, as illustrated in Figure 2, so that the can will again be in the drier for approximately fifteen minutes. Also, during all of this travel through the oven, the can C will be subjected to the action of heated air.

The can will be removed from its carrier 35 by a can removing mechanism 38 positioned at the opposite end of the oven from the infeed and spraying mechanism 18, as shown in Figure 1. As best shown in Figures 14 and 15, the mechanism 38 comprises a rotary wheel provided with axially projecting suction plungers 39. The plungers 39 are successively brought into contact with the mouths of the cans C within the carriers 35 and draw the cans into a pocketed discharge wheel 40 from which they may be removed by any suitable mechanism.

The detailed construction of the various mechanisms of the apparatus is set forth below.

*Infeed mechanism and mechanism for conveying cans by engagement with can mouth*

Figure 13:
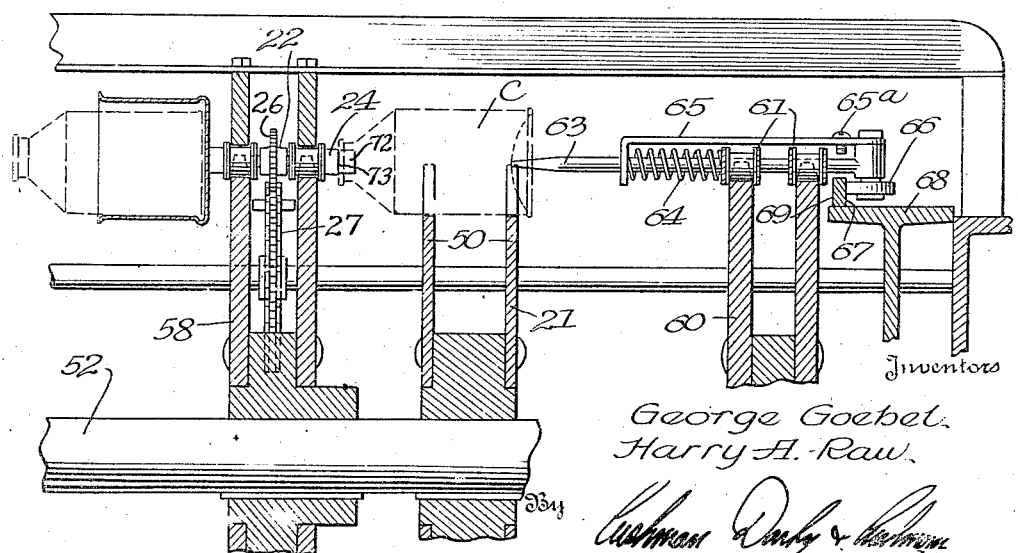
Figure 13 is a view on an enlarged scale of a portion of the mechanism shown in Figure 12.

Referring to Figure 5, the infeed chute 20 is formed of substantially vertically extending rods secured together in suitable arrangement to guide a cone top can downwardly through the same with the longitudinal axis of the can lying in a horizontal plane, the lower end of the chute terminating above the rotary infeed spider 21. As best shown in Figures 12 and 13, the infeed spider 21 is formed of two discs 50 secured to a hub 51 keyed on a shaft 52 journaled between the side frame elements 54 and 55.

Shaft 52 is rotated by reason of the fact that it carries a large sprocket wheel 58 formed of spaced discs having notches 59 in their peripheries, which notches are engaged by the spindles 25 on main conveyor chain 22 as the main conveyor chain moves over the wheel 58 by a drive imparted thereto as hereinafter described.

As part of the can seating mechanism 23, shaft 52 also has a pair of spaced sprocket wheels 60 secured thereto, preferably on a common hub 60a, and a pair of relatively spaced sprocket chains 61 move about these sprocket wheels, and also about a second pair of sprocket wheels 62 positioned somewhat further along the frame of the machine as shown in Figure 5, so that the upper run of the two chains 61 will be parallel to the upper run of main conveyor chain 22.

At the moment that a can C is positioned in one set of the pockets provided in the peripheries of the discs 50 of infeed spider 21, one of a series of rods or plungers 63 each reciprocably mounted in the two laterally spaced endless chains 61 will be opposite the central portion of the bottom of a can, as best shown in Figures 3, 12, and 13. As illustrated in detail in Figures 12 and 13, the rod 63 is urged toward the bottom of the can by a spring 64 surrounding the rod and positioned between the adjacent chain 61 and the head of an angled bar 65, which angled bar extends along the rod and back over the chains 61 to the opposite and rear end of rod 63. The rear end of the rod 63 has a roller 66 journaled thereon, which roller engages a cam track 67 extending about an arcuate plate 68 fixed to the framework of the apparatus.

As indicated in Figure 12, each spring 64 urges the corresponding rod 63 toward the spider 21 and during movement of a rod 63 along the lower run of the path of travel of the chains 61, each spring 64 is free to move its rod to its extreme inward position (the left-hand position of Figure 12), this movement being limited by the contact of the screw 65a carried by each bar 65 with the rear side of the adjacent chain 61. However, when the roller 66 of the rod engages the cam shoulder 67, the rod will be retracted through the chains 61 so that its inner end will be clear of a can C just being positioned in the infeed spider 21. Immediately thereafter, the roller will move off the upper and inwardly inclined end 69 of cam shoulder 67 so that the inner end of the rod 63 will contact with the bottom wall of the can which has been deposited in the pocket of the infeed spider 21. The spring 64 is of sufficient strength to slide the can through the pocket of the infeed spider 21 to bring the mouth of the can onto the aligned can supporting head 24 of the main conveyor chain 22.

As is described in said original application, and as is best shown herein in Figure 13, each can supporting head 24 is pinned to one of the spindles 25 included in the main conveyor chain 22, and the outer end of each head 24 is of sufficiently reduced diameter, as indicated at 72, to enable the mouth of the can to freely slide upon the head. However, the reduced portion 72 is of sufficiently large diameter to prevent the can from tilting sufficiently far to fall from the same. The inner end of the reduced portion 72 terminates in an outwardly facing shoulder 73, which limits the inward movement of the can C with respect to the head.

After the main conveyor 22 moves a very short distance in the direction indicated by the arrow B in Figure 3, each can C will be freed from the infeed spider 21, and the presser rod 63 aligned with each can will be carried by its similarly moving supporting chains 61 away from the stationary cam 67 so that the roller 66 of that rod will be entirely disengaged from the cam 67 and the rod will be held in contact with the bottom of the can by its spring 64, as indicated in Figure 3. If the can is being coated, the sprocket wheel 26 fixed intermediate the length of the can supporting spindle 25 will contact with the sprocket chain 27 (Figure 12) which moves in the opposite direction to the direction of travel of main conveyor 22.

Since the presser rod 63 is at this moment in contact with the bottom of the can C, the can will be held in a substantially horizontal plane while the spindle 25 which carries the same is being rotated at a fairly rapid speed of rotation by chain 27. If the can is being coated, it will move beneath the two spray guns 28 and 28a supported from a cross frame 90 while it is still rotating. The spray guns may be supplied with lacquer under pressure from any suitable source, and spray gun 28 is positioned at such an angle, as shown in Figures 3 and 12, that it will direct a spray of lacquer against the bottom wall of the can and also against the side wall of the can. The spray gun 28a is supported at such an angle by the frame 90 that it will direct lacquer against the conical top portion of the can and somewhat about the exterior of the can mouth. Due to the rapid rotation of the can during the spraying, lacquer will be deposited over all of the above described exterior surfaces of the can. Also, by reason of the fact that the rotation of the cans continues for a brief time after each can has passed out of the range of the spray guns, the lacquer will be freely flowed over such exterior portion of the cans to be evenly distributed thereon. Due to the fact that the can is supported by its mouth, as indicated in Figure 13, the spray gun 28a may not project lacquer over the entire lip surface of the can.

As indicated in Figure 3, the presser rod 63 will be retracted from the can by reason of the fact that the roller 66 on the presser rod will come into contact with a fixed cam shoulder 95 arranged concentric with the axis of the sprocket wheels 62, cam shoulder 95 being of such conformation that it will retract each presser rod 63 from a can bottom as the presser rod moves downwardly and about the sprocket wheels 62 with the rod carrying sprocket chains 61.

While the cans are moving to the oven or drier 19 on the main conveyor 22, the presser rods 63 will move through the lower run of travel of the can seating mechanism chains 61 to again ride along the stationary can shoulder 67 to engage another can newly positioned upon the infeed spider 21.

*The drier mechanism*

As best shown in Figure 2, when entering the drier 19, the main conveyor chain 22 moves upwardly about a guide sprocket 100 and then over an upper guide sprocket 101 to run in a horizontal path to an upper sprocket 102 at the rear end of the oven. The chain then alternately moves about vertically spaced idler sprockets and shafts 103 at the rear end of the drier and driven sprockets 104 at the front of the oven so that the chain follows a tortuous course through the heating chamber 105 which comprises the main portion of the drier 19. As shown in Figure 8, the shafts 104 are interconnected by sprocket chains 106 outside the drier, the lowermost shaft 104 being driven by a sprocket chain 107 from a motor 108. Shaft 101 is geared to the uppermost shaft 104. The shafts 102 and 100 are idler shafts.

At the lower end rear portion of the chamber 105, the conveyor 22 leaves the oven through an opening 110 and passes about a large sprocket drum 111 forming part of the can removal or outfeed mechanism. The cans carried upon the supporting heads 24 of the main conveyor 22 will not be removed by the mechanism 38, but will continue to move with the conveyor chain 22 through the lowermost and cooling chamber 112 of the drier 19, the conveyor moving directly through this chamber and leaving the same through the front opening 113.

The oven or drier 19 is of such relatively large proportions as indicated in Figures 1 and 2 that that though the conveyor 22 is driven at sufficient speed to handle incoming cans at the rate of one hundred and forty per minute, nevertheless, approximately fifteen minutes will elapse between the entrance of a can upon the conveyor chain 22 into the drier 19 and the exit of that can from the drier through the opening 113.

The heating chamber 105 of the oven is supplied with heated air from a heating apparatus generally indicated by the numeral 115 (Figures 1, 2 and 8), the heated air being forced into the oven by a blower 116. Such air flows through an inlet duct 117 to a distributing duct 118 which extends the length of the bottom of the oven and is provided with suitable openings in its upper wall to permit flow of heated air therefrom at various points along the length of the oven.

A suction fan 119 communicates with an exhaust duct 120 positioned in the upper portion of the heating chamber 105, the duct 120 drawing air from the entire length of the oven. The withdrawn air and fumes may be returned through a duct 121 to the suction side of the blower 116 to be re-delivered to the oven, or may be at least partially exhausted from the apparatus through an outlet duct 121a.

As indicated above, the extreme lower run of the conveyor 22 moves through the cooling chamber 112 at the bottom of the drier 29. Chamber 112 has a duct 122 communicating therewith at various points spaced along one side wall, which duct is supplied with cool air or air at normal temperature by a blower 123 driven by a motor 124. The air entering the chamber 112 from duct 122 may move directly through the chamber to exhaust through the opposite opening and opposite side 125 of this chamber, or may be conveyed away by a suitable duct.

By the above arrangement, the coating of lacquer applied to a can C will be completely dried and hardened and the can is at normal temperature when it leaves the drier 19.

*Mechanism for transferring cans to opposite side of conveyor*

After leaving the drier 19, a can mounted on a can supporting head 24 and moving with the lower run of the conveyor 22 will move to the left as viewed in Figures 5 and 11 so that the can will be carried beneath (and entirely clear of) the infeed spider 21 to the extreme end portion of the run of the conveyor 22, which encircles a large double sprocket wheel 126 best shown in Figure 10. Sprocket wheel 126 is fixed to a shaft 127 suitably journaled in the side frames of the apparatus and, as shown in Figure 3, is geared as at 128 to a shaft 129 at the extreme end of the apparatus which is driven through a series of sprocket chains 129a from the motor 108.

The two sprocket chains of which the main conveyor 22 is formed will be engaged by the two sprocket wheels of double sprocket 126 so that the spindles 25 will be maintained horizontal.

Shaft 127 has the spider 31 fixed thereto alongside the sprocket wheel 126 and the spider 34 is fixed to shaft 127 at the opposite side of sprocket 126. As shown in Figure 10, as a spindle 25 moves adjacent double sprocket 126, the can C carried by the supporting head 24 of that spindle will move into a pocket of spider 31 and rotation of the spider with shaft 127 will move the can upwardly as shown in Figure 11. Just before moving upwardly about the spider 31, the side wall of each can will contact with a pair of guide strips 130 (Figures 9 and 11) which will force the can to lie in a horizontal plane.

A lateral guide bar 135 is positioned adjacent the guide bars 130, guide bar 135 being inclined outwardly toward the plane of the spider 31, so that as the cone top wall of a can comes in contact therewith as indicated in Figure 10, the mouth of the can will be moved out of engagement with the can supporting head 24 and, as shown in Figure 11, the can will merely be supported in the pockets of spider 31 by the bottom guide strips 130.

As illustrated in Figure 11, the pockets of the spider 31 are aligned with grooves or pockets 131 in the transfer drum 32 and a pair of spaced helical guide bars 132 surround the periphery of transfer drum 32, the infeed ends 133 of the bars 132 projecting between the discs 134 of which the sprocket 31 is formed, with the extreme lower ends of the infeed portion 133 of the guide bars positioned substantially directly between the axes of the spider 31 and transfer drum 32 and between the two discs of which spider 31 is formed.

By the above arrangement, each can will be freed from its supporting head 24 immediately after it comes in contact with the lower guide 130 and lateral guide 135 and the cans will then be moved up the lower guide 130, free of the conveyor 22, by engagement of the pockets of the spider 31 with the side walls of the cans. Just after the can thus carried by the spider 31 comes into engagement with one of the pockets or grooves 131 of transfer drum 32 fixed to shaft 129, the opposite portion of the can will also come into contact with the infeed end 133 of the helical guide bars 132, so that the can will now be completely stripped from the spider 31 and will move upwardly with the transfer drum 32.

A pipe 140 of helical form also encircles the periphery of transfer drum 32, this pipe being positioned somewhat to the side of the helical guide bars 132 nearest the plane of spider 32, and between these guide bars and the periphery of the transfer drum (Figure 7). Pipe 140 has apertures therein on its surface facing along the grooves 131 and the pipe is supplied with compressed air from a suitable source through a line 141. The guide bar 35a, also of generally helical form, is positioned on the side of the guide bars 132 opposite pipe 140, and between guide bar 132 and the periphery of the transfer drum. The guide bars 132 and 35a and the pipe 140 are suitably supported by brackets adjacent the drum 32 as illustrated in Figures 9 and 11.

By the above construction of guide elements about the transfer drum 32, as soon as a can is completely freed from the spider 31, it will be forced to the left (Figure 9) by the jets of compressed air issuing from the pipe 140. Such movement of the can along the grooves 131 will cause the can to be moved out of the vertical plane of the spider 31 and into the plane of spider 34 (Figure 10). It will be observed that the provision of the helical guide bar 35a opposite the compressed air pipe 140 will cause cans to be moved along the grooves 131 of the transfer drum by a continuous and gradual movement. That is to say, there can be no sudden movement of the cans along the grooves such as might cause the mouths of the cans to be dented.

Each can will remain upon the transfer drum 32 during one full revolution of the same, and, as best indicated in Figure 9, at the time that this one revolution is completed, the mouth of the can will project from the far edge of the drum and will partly lie in the spider or disc 33. In other words, as indicated in Figure 3, each can enters the drum 32 directly in the plane of the spider 31 but, because it moves in a helical path, leaves the drum in the plane of spider 34, somewhat as indicated at A in Figure 3. At this moment, also, the can will ride beneath an arcuate guide bar 145 which overlies the can receiving spider 34 and the can will be stripped from drum 32 and placed in an aligned pocket of spider 34. As shown in Figures 3 and 4, the substantially helical guide bar 35a which surrounds transfer drum 32 has its outfeed end 143a extending away from the transfer drum 32 with the extreme end portion thereof return bent toward the spider 34 with the result that as upwardly moving cans are removed from the transfer spider by fixed arcuate guide 145, the cans will simultaneously be moved axially of the spider 34 and into cup-shaped holders 35 provided on the main conveyor 22 or may be supported by other conveyor means.

After a can has been positioned in the cup-shaped carrier or supporting means 35 as illustrated in Figure 3, the movement of the main conveyor 22 toward the drier will bring the projecting cone-shaped portion of the can beneath the spray gun 36, as shown in Figure 12. Gun 36 is supported at such an angle that it will direct lacquer upon the mouth of the can, including the inner wall of such mouth. During movement beneath the spray gun 36, the spindle 25 to which the carrier 35 is secured will be rotated by movement of the endless chain 27 beneath the same and in engagement with the sprocket 26 which is secured to the spindle.

After the spindle has moved out of engagement with the endless chain 27 and from beneath spray gun 36, the can C will be carried into the drier 19, following the same course of travel that it followed when supported upon the supporting head 24. However, during the present movement through the drier, the can will move only through the heated portion 105 of the drier; that is, when the carrier 35 leaves the rear end of the oven through the opening 110, the can will be removed by the can-removing apparatus 38, illustrated in detail in Figures 14 and 15.

As shown in Figures 14 and 15, the portion of the conveyor 22 which moves from the drier through the opening 110 moves about a sprocket 150 fixed to a shaft 151 journaled in suitable bearings indicated at 152. Shaft 151 also carries the outfeed spider 40, as well as a wheel 38, having suction elements 39 spaced about its periphery, the suction elements 39 being of rod-like form and reciprocable in the wheel 38 on lines parallel with the axis of the wheel, and one suction element 39 being aligned with each carrier 35 on the conveyor 22 and also with pockets on the outfeed spider 40. The outfeed spider 40 is positioned between the conveyor sprocket wheel 150 and the wheel 38.

Each suction element 39 has a roller 155 provided thereon, which roller moves in a circular cam track 156 formed on the periphery of a fixed cylindrical supporting element 157. The cam track 156 is of such form that when a suction member or rod 39 is at top dead center position on the wheel 38, that suction element will be positioned inwardly so that its mouth 160, preferably formed of rubber, will be in engagement with the mouth of the can C supported in the aligned carrier 35. As the wheel 38, outfeed spider 40 and conveyor sprocket 150 rotate together in the direction of the arrow in Figure 15, the suction element 39 will be retracted until it has entirely withdrawn the can from the carrier 35 as shown at the lower portion of Figure 14. This movement will be completed at about the time that the can and suction element reach bottom dead center position (Figure 15). During its continuing travel between this lower position and the upper position, the suction element 39 may be moving outwardly again toward the spider 40.

Each suction element 39 has a tube 161 extending between the bore 162 of the tube and a ring 163, which ring is rotatable upon a manifold 164 fixed to the bearing housing at the adjacent end of shaft 151. As shown in Figure 14, the ring 163 is provided with an angled passage 163a for each tube 161, this passage opening to the inner side of the ring so that it may communicate with an arcuate suction passage 165 formed in the fixed ring 165a and communicating with a suction pump through a line 166. As shown in Figure 14, the arcuate suction passage 165 is so positioned in the ring 165a that a tube 161 will communicate therewith during the time that the corresponding suction head 39 is approaching top dead center position with respect to shaft 151 and that head is therefore moving outwardly toward the aligned can mouth (by action of cam track 156) and until the suction head 39 has been retracted by the cam track 156 a sufficient distance to draw the can C from the carrier 35 into the aligned pocket of the outfeed spider 40. The passage 164 of that suction head will at that time move into communication with a second passage 170 in the fixed ring 164, which passage opens to the atmosphere. By this latter arrangement, the suction acting upon the can through the head 39 will be terminated and the suction head freed from the mouth of the can so that the can will be free to drop from the outfeed spider 40. A collar 171 fixed to shaft 151 includes pins 172 which extend into ring 163 so that the latter will rotate with respect to fixed ring 165a. Springs 173 positioned between collar 171 and ring 163 hold the latter in close engagement with fixed ring 165a.

The operation of the entire apparatus has been set forth in the general description and operation of the apparatus at the opening portion of this specification. Figure 1 illustrates how two apparatus of the present invention may be positioned side by side in such a way as to conserve floor space, namely, by having the drier blower and motor of one drier 19 offset with respect to the blower and motor of the other drier, and with these blowers, motors, et cetera, positioned between the two apparatus.

It will be understood that the various mechanisms described as forming part of the present apparatus may be used either together, as described, or as portions of other article handling apparatus.

The terminology used in the specification is for the purpose of description, the scope of the invention being indicated in the following claims.

We claim:

1. In combination, a conveyor, means extending laterally from said conveyor to support an article, a rotary article supporting members spaced laterally from said conveyor, a moving element positioned at the opposite side of said member from said conveyor, plungers reciprocable in said last-named element adapted to engage articles carried by said member, and means to reciprocate said plungers to engage an article carried by said article supporting member and move it into engagement with the article supporting means on said conveyor.

2. In combination, an endless conveyor including means extending laterally therefrom to support articles, moving means spaced laterally from said conveyor to support articles in alignment with said supporting means on the conveyor, and stationary guide means associated with said moving means and positioned in the path of movement of articles carried by the latter to engage the articles and move them from said moving means and into engagement with said supporting means on the conveyor.

3. In combination, an endless conveyor having means projecting from one side thereof to support an article, means projecting laterally from the other side of said conveyor to support an article, and means including an element moving with said conveyor to remove an article from said first-named supporting means and position it upon said last-named supporting means.

4. In combination, an endless conveyor having means projecting from one side thereof to support an article, means projecting laterally from the other side of said conveyor to support an article, and a rotary drum adjacent said conveyor and of a width sufficient to support articles in the plane of both of said article supporting means on said conveyor, and means to remove articles from said conveyor, position them on said drum, move the articles transversely of said drum and reposition the same upon the other article supporting means of said conveyor.

5. The combination in an apparatus for successively treating different portions of an article, of an article transfer means comprising a rotary drum having grooves in its periphery extending parallel to its axis, means to position an article in a groove of said drum adjacent one end thereof, and fixed helical guide means encircling said drum to engage an article positioned thereon and move the same to the opposite edge of said drum, said fixed guide means including a jet member to direct fluid against the article to move the same across the width of said drum.

6. In combination, an article conveying element, means to support an article carried by said element, an article supporting element movable co-axially with said element, a suction exerting article engaging device movable co-axially with said elements, and means to move said device into engagement with an article on said conveying element to exert a suction effect on the article and then move said device to withdraw the article from said conveying element to said supporting element.

7. In combination, conveyor means, a series of article supporting members projecting in one direction from said conveyor means, a second series of article supporting members projecting in another direction from said conveyor means, a transfer drum adjacent said conveyor means and rotatable on an axis parallel to the axis of the latter, means to transfer articles to said drum from the members extending in one direction from said conveyor means, means to move an article along said drum in a direction parallel to the drum axis, and means to then transfer the article from said drum to one of the article supporting members extending in the other direction with respect to said conveyor means.

HELENE GOEBEL,
*Administratrix of George Goebel, Deceased.*
HARRY A. RAU.